Nov. 14, 1961 J. G. LOGAN, JR 3,008,292
WAVE ENGINES
Filed Feb. 15, 1961

INVENTOR.
JOSEPH G. LOGAN, JR.
BY
*Louis B. Applebaum*
ATTORNEY 3,008,292
WAVE ENGINES
Joseph G. Logan, Jr., Buffalo, N.Y., assignor, by mesne assignments, to the United States of America as represented by the Secretary of the Navy
Filed Feb. 15, 1961, Ser. No. 89,586
2 Claims. (Cl. 60—39.76)

This invention relates to improvements in high compression ratio thermal engines, and more particularly pertains to wave engines utilizing nonsteady wave phenomena for compression.

The invention provides wave engine structure whereby combustion occurs at constant volume after wave precompression. Constant volume is accomplished by providing three rotary valves, a first valve at the inlet to a wave tube, a second valve between the wave tube and the combustion chamber, and a third valve at the exhaust opening of the combustion chamber. Sudden closing of the third or exhaust valve produces a hammer wave that travels upstream, compressing the compressible mixture in the wave tube. After the passage of this wave through the combustion chamber, the second valve closes and the mixture is ignited. When the hammer wave reaches the wave tube inlet, the third or exhaust valve closes to conserve the energy. Simultaneously, the first or inlet valve opens, discharging the burned gases at constant velocity. An expansion wave is created at the exit, and this expansion wave moves upstream toward the wave tube. The second valve closes as this wave reaches it, thus generating another wave which augments the scavenging. Further waves increase compression for the succeeding charge.

The principal object of this invention is to provide a novel constant volume combustion wave engine.

Another object is to provide a wave engine adapted to utilize nonsteady wave phenomena for compression, wherein combustion occurs at constant volume after wave precompression, which occurs through a series of shocks.

A further object is to provide a wave engine that reduces the entropy loss associated with compression through a single strong shock by effecting wave precompression through a series of shocks.

Other objects and many of the attendant advantages of this invention will be readily appreciated as the same becomes better understood by reference to the following detailed description when considered in connection with the accompanying drawings wherein.

Similar numerals refer to similar parts throughout the several views.

Figure 1:
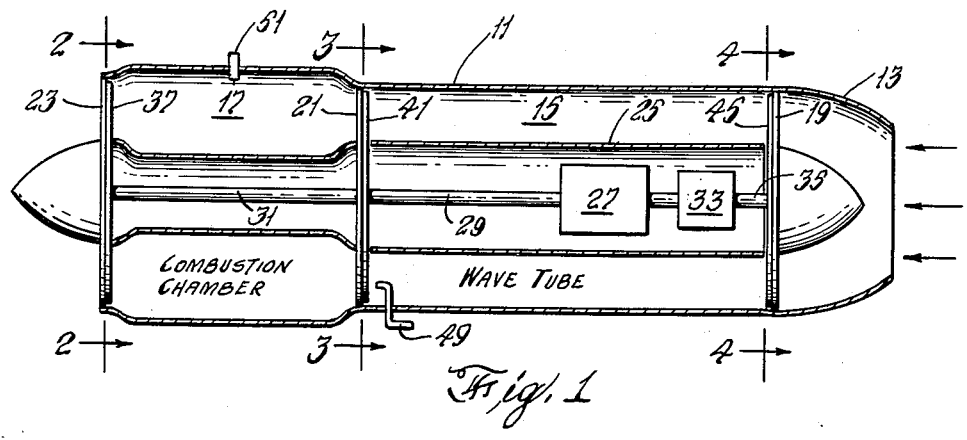
FIG. 1 is a sectional elevation of a wave engine, showing a preferred embodiment of the invention.
Figure 2:
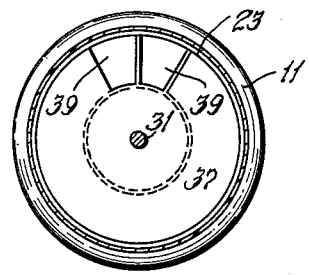
FIG. 2 is a section taken on the line 2—2 of FIG. 1.
Figure 3:
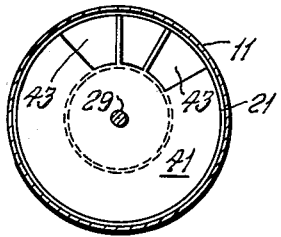
FIG. 3 is a section taken on the line 3—3 of FIG. 1.
Figure 4:
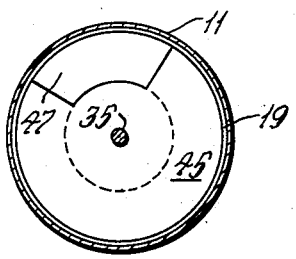
FIG. 4 is a section taken on the line 4—4 of FIG. 1.

The wave engine comprises an elongate cylindrical shell 11 that carries a frusto-conical inlet section 13, an annular elongate wave tube 15, and a toroidal combustion chamber 17. An inlet valve 19 couples the inlet section 13 and the wave tube 15, a medium valve 21 couples the wave tube 15 and the combustion chamber 17, and an exhaust valve 23 is mounted aft of the combustion chamber 17.

The valves 19, 21 and 23 are carried by an axial hub member 25 in which is seated an exhaust and median valve drive 27 coupled to valves 21 and 23 by shafts 29 and 31, and an inlet valve drive 33 coupled to valve 19 by shaft 35. The rotor disc 37 of valve 23 includes a plurality of slots 39 adapted to register with like slots of its stator disc; similarly, rotor disc 41 of valve 21 includes a plurality of slots 43 adapted to register with like slots of its stator disc, and rotor disc 45 of valve 19 includes a slot 47 adapted to register with a like slot of its stator disc, thereby providing an open and a closed position for each of said valves, dependent upon the rotated orientation of each.

Ignition means is provided for combustion chamber 17, and is a suitable fuel injector 49. For purposes of clarity, additional details of structure are omitted, as such details are well known in the art.

In operation, it can be seen that the sudden closing of the exhaust valve 23 by rotation of rotor disc 37 produces a hammer wave that travels upstream, compressing the combustible mixture in the wave tube. After the passage of this wave through the combustion chamber 17, the valve 21 closes, and the mixture is ignited by suitable means such as an ignition source 51. Combustion then occurs at constant volume. When the hammer wave reaches the wave tube inlet, the inlet valve 19 closes, reflecting the wave to conserve this wave energy. Simultaneously, the exhaust valve 23 opens, thus discharging the burned gas at constant velocity. An expansion wave is created at the exit during this process, and such expansion wave moves upstream into the wave tube. When this expansion wave reaches the median valve 21, said valve 21 opens, thus generating another compression wave that augments the scavenging, maintaining an approximately constant exhaust velocity at the exit. Upon completion of scavenging, the exhaust valve 23 closes, creating a hammer wave providing the initial compression.

By proper timing, the hammer wave previously reflected at inlet valve 19 is now reflected at exhaust valve 23, thereby further increasing precompression. When this wave passes the median valve 21 at the intake to the combustion chamber 17, the valve 21 closes, and the cycle is repeated. Simultaneously, the previously created expansion wave drops the pressure at the intake valve 19, and inflow occurs.

The use of the three valves, as here described, permits exhaust at constant exit velocity and more rapid scavenging, thereby affording improved cycle performance. In addition, the use of the median valve 21, at the intake to the combustion chamber, permits combustion to occur, more efficiently, at constant volume. Such median valve also prevents the entropy loss due to repeated passage of strong shocks in the working fluid prior to combustion.

Obviously many modifications and variations of the present invention are possible in the light of the above teachings. It is therefore to be understood that within the scope of the appended claims the invention may be practiced otherwise than as specifically described.

I claim:

1. A wave engine comprising an elognate cylindrical housing, a combustion chamber carried in the aft portion of said housing, a wave tube carried in said housing forward of said combustion chamber, an inlet valve mounted at the forward end of said wave tube, a valve coupling the aft end of said wave tube and the forward end of said combustion chamber, and an exhaust valve carried by said housing at the aft end of said combustion chamber, means to inject fuel into said combustion chamber, ignition means in said combustion chamber, and means to time the actuation of said valves and said fuel injection and ignition means.

2. The combination of claim 1 in which said combustion chamber is a toroid and said wave tube defines an elongate annulus.

No references cited.